Sept. 4, 1934.   W. H. LARRABEE   1,972,526
WATER METER
Filed Jan. 11, 1932

Inventor
William H. Larrabee
by attorneys

UNITED STATES PATENT OFFICE 1,972,526

WATER METER

William H. Larrabee, Auburn, Mass., assignor to Union Water Meter Company, Worcester, Mass., a corporation of Massachusetts Original application July 17, 1928, Serial No. 293,470. Divided and this application January 11, 1932, Serial No. 585,953

2 Claims. (Cl. 73—98)

This case contains matter originally presented and divided out of my application filed July 17, 1928, Serial No. 293,470.

The principal objects of this invention are to avoid the making of a tight joint between a tapered wall or surface of the outer casing of a water-meter and a corresponding tapered surface on the measuring disc chamber and the disadvantages to which such a construction is liable, as the sticking of the parts on account or corrosion and the difficulty of removal; to provide a straight machined casing and disc chamber in place of the tapered ones heretofore used, thus making the meter easier to manufacture and assemble and less complicated; to provide simple and convenient means for forcing the outlet of the disc chamber against the outlet of the casing so as to form a tight non-leaking joint which will also cause the disc chamber to act more quickly when the meter is frozen and the bottom plate broken; and to provide means by which no obstruction will be presented to the taking out of the disc chamber when the meter has been frozen.

Other objects and advantages of the invention will appear hereinafter.

Reference is to be had to the accompanying drawing in which

Figure 1:
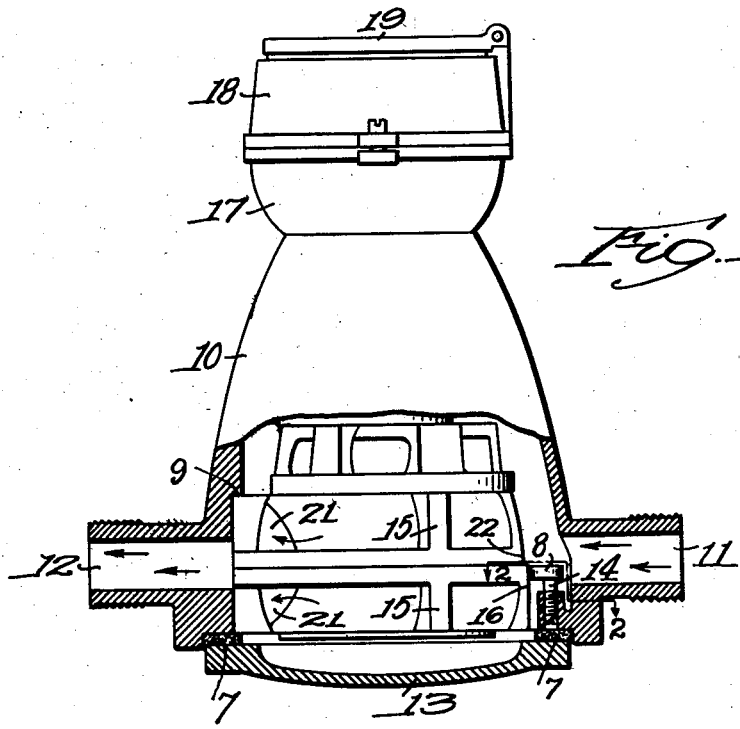
Fig. 1 is a side view of a meter with parts in section on a diametrical line through the inlet and outlet.
Figures 2, 3:
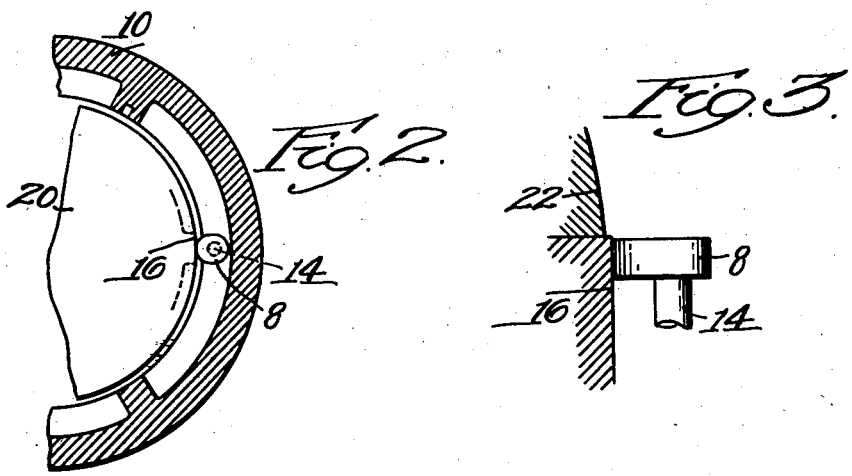
Fig. 2 is a horizontal sectional view on the line 2—2 of Fig. 1.
Fig. 3 is a side view of a portion of the disc chamber.

This invention involves improvements in a well known type of meter and the elements of the meter are shown herein operating in general in the usual way, and there is nothing new in the method of measuring the water in this case. The various features of this invention are shown as applied to the so-called King Disc Meter, which is of the positive measuring self-draining type.

As is usual, the meter comprises a casing 10, preferably of bronze, to provide a non-rusting surface, having an inlet 11 and an outlet 12. This casing is shown in this case as having its open bottom closed by a cast iron plate 13 capable of being fractured by the ice pressure. This casing as usual has a flaring portion 17 at the top and a cap 18 which is provided with a pivoted cover 19 under which are the pointers and dial to be read to show the amount of water measured by the meter.

The bronze disc chamber 20 is placed, in assembling, with its outlet port registering with the outlet port of the casing. The two finished surfaces thus meeting are both vertical and straight, that is, cylindrical to form a tight non-leaking joint. The disc chamber is placed with its upper edge against a shoulder 9 on the upper casing. A cam or eccentric 8 is then turned, bearing as it does on the exact opposite side of the lower end of the disc chamber, forcing the casing against the inner wall of the outlet port 12. When the joint is made, the chamber is held in place by means of the bottom plate and the gasket 7 which is supplied.

In order to loosen the chamber, all that is necessary to do is to remove the bottom plate, give the cam or eccentric 8 a slight turn, which can be done by introducing a small tool or screw-driver inside and operating the stem 14 on which the cam is fixed. This has a slot in its end for a screw-driver. Then the inside mechanism will all drop out. This arrangement also causes the disc chamber to act more quickly when the meter is frozen and the bottom plate broken.

The disc chamber is provided with a plurality of separated vertical surfaces 15 which are the ones turned to a true cylindrical shape, as stated. Three of these are shown, one wide surface in which the outlet is located and two narrow surfaces. Between the latter and exactly diametrically opposite the outlet is a cast vertical surface 16 against which the cam 8 engages for locking this chamber in the casing. This surface 16 is uniform and of arcuate cylindrical shape and is located on the bottom half of the lower part of the disc chamber. Directly above it on the upper half of the disc chamber is an inwardly slanting cast, or unfinished, surface 22. The cam engages the surface 16 near the top thereof. In case of freezing, the bottom plate 13 breaks and the cam of course remains in locking position, but when the lower half of the casing 20 moves even slightly downward, either by the expansion of the ice, or otherwise, the cam 8 passes off the surface 16. This leaves it in registration with the inwardly slanting surface 22 and no obstacle is presented to the removal of the disc chamber. This is the only feature shown herein not contained in, and divided out of, my above named application.

It has been customary heretofore to place the entire metering mechanism in the upper casing and hold it in place by the cast iron bottom. It is necessary therefore to machine the inside of the upper casing to a certain taper and the disc chamber to a corresponding taper to fit in it, thus forming a tight joint when the disc chamber is forced in. This construction prevented leakage but it was difficult to make and after considerable use the two parts would be liable to corrode together so as to be very hard to separate. In order to avoid these difficulties I make these two parts entirely separate so that they do not fit each other at all except at one side and the disc chamber is held in place by the eccentric or cam 8 and the bottom plate 13 cooperating with the shoulder 9, as stated. The water entering the inlet 11 goes into the bronze disc chamber 20 through an inlet opening 21.

It will be seen that I have provided a plurality of improvements in the existing structure, these improvements all tending to facilitate the separation of the parts automatically in case of freezing, without breaking the parts and add to the ease of assembling and dis-assembling for repair, as well as avoid the setting up of galvanic action between the dissimilar metals necessarily employed. Also the disc chamber is held in place in a novel manner and this prevents leakage without any necessity of machining the disc chamber to exactly fit a tapered surface on the inside of the meter casing.

Although I have illustrated and described only one form of the invention I am aware of the fact that modifications can be made therein by any person skilled in the art without departing from the scope of the invention as expressed in the claims. Therefore, I do not wish to be limited in this respect, but what I do claim is:—

1. In a water-meter, the combination of a casing and disc chamber therein, the casing having a separate bottom which can be broken to open the casing, a cam pressing on the side of the disc chamber to force the chamber against one wall of the casing to provide a tight fit to prevent leakage, and a stem to which the cam is fixed and by which it can be turned accessible from the bottom of the casing when opened.

2. In a water-meter, the combination of an upright casing and disc chamber therein inside the casing engaging one side of the casing but not the other, a cam engaging the side of the disc chamber which does not engage the casing and mounted to be turned on a vertical axis to force the chamber horizontally against the opposite wall of the casing to provide a tight fit to prevent leakage, said cam having an operating stem accessible from the bottom when the casing is opened, the disc chamber having a surface against which the cam engages and a receding surface immediately above the last named surface to facilitate the removal of the disc chamber in case of freezing.

WILLIAM H. LARRABEE.